Patented Feb. 12, 1946

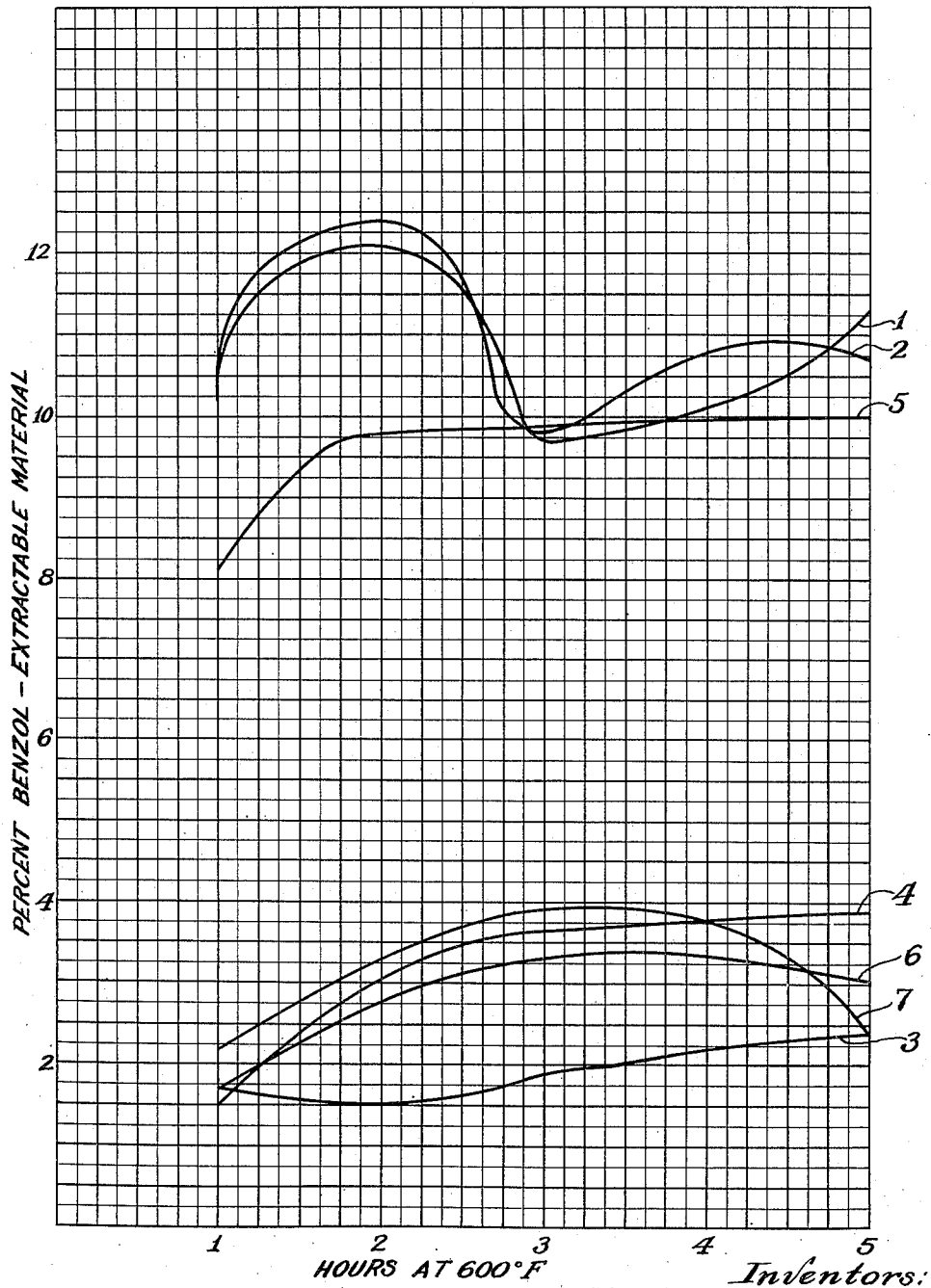

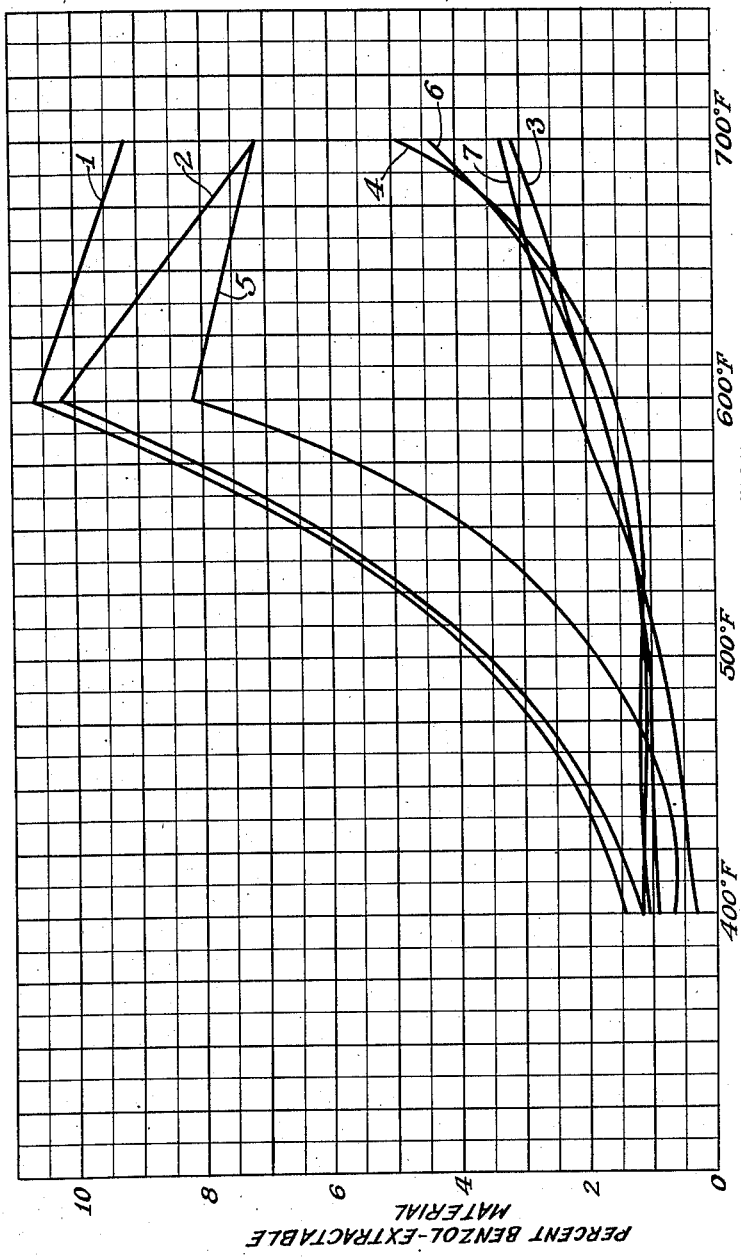

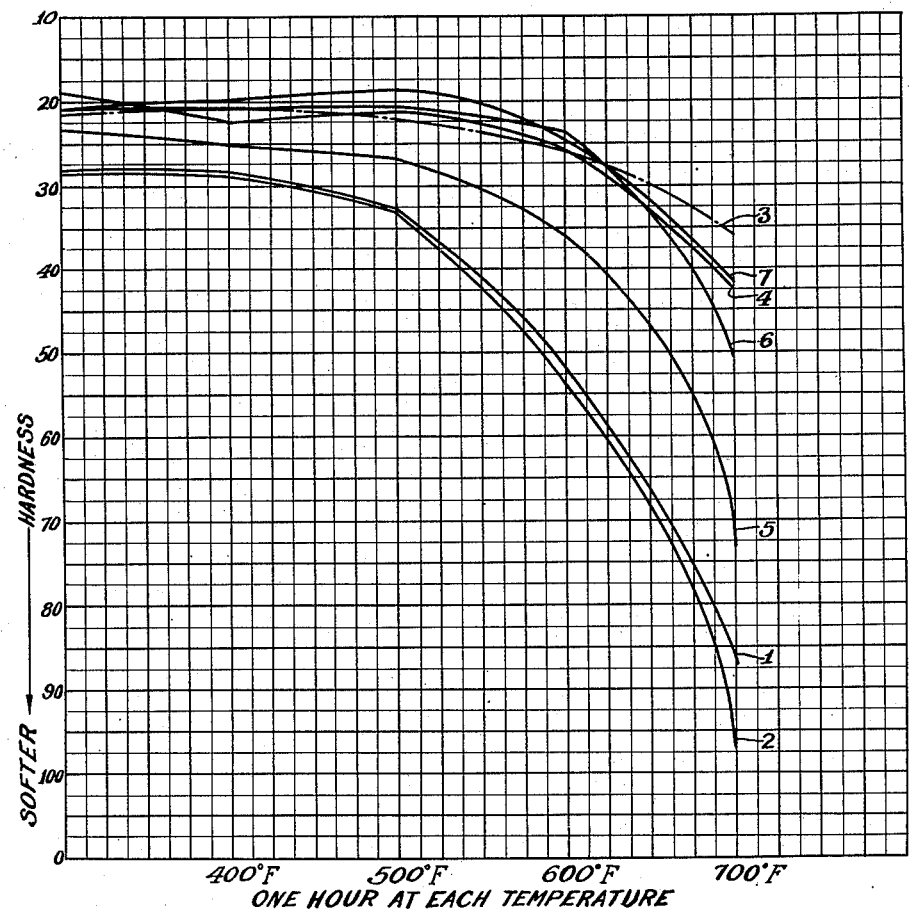

2,394,783

UNITED STATES PATENT OFFICE 2,394,783

FRICTION ELEMENT

Emil C. Keller, Detroit, and Ray E. Spokes, Ann Arbor, Mich., assignors to American Brake Shoe Company, a corporation of Delaware Application May 9, 1942, Serial No. 442,310

2 Claims. (Cl. 260—41)

This invention relates to friction elements and to making the same and more particularly, the present invention relates to friction elements of the type which are employed in the brakes of automotive vehicles, including trucks and buses, as well as for clutch facings and the like.

Friction elements of the aforesaid character, as now made, are composed, in general, of friction material, such, for example, as asbestos, together with an organic binder and other organic or mineral friction-controlling or imparting agents together with other materials which may be employed for imparting specific properties or characteristics to such friction elements, such, for example, as greater heat resistance.

Friction elements which are intended for heavy duty use upon heavy automotive trucks, buses and the like are commonly subjected to severe service conditions, that is to say, they are subjected in use to repeated and often prolonged braking operations which develop high temperatures in such friction elements, such temperatures frequently approaching 1000° F. on the friction surface of the friction elements, and progressively lower temperatures inwardly of the friction surfaces thereof. Such high temperatures, especially when occuring or repeated frequently, tend to depolymerize or otherwise decompose organic bonding materials, such as vulcanized natural rubber, and certain synthetic rubbers, which have been employed in friction elements subjected to such temperatures. Accordingly, there is a consequent tendency of such friction elements to exhibit loss of stability of friction characteristics due to the presence on the friction surface or within the friction element of depolymerized and otherwise liquefied products of heat decomposition of the organic bonding material. The loss of stability, as aforesaid, in friction elements bonded with vulcanized natural hard rubber results from the heat decomposition of the bond in such friction elements, and the consequent formation of a high percentage of benzol-extractible material, and is accompanied by the formation of a glazed surface. This condition results largely from the baking on the friction surface of the products resulting from the heat decomposition of the bond.

Moreover, the glazed film thus formed on the friction surface of friction elements bonded with vulcanized natural hard rubber, cannot readily be removed and is not self-removing since it decreases subsequent friction and heat formation so that a friction element with such a surface not only loses stability of friction characteristics but tends to retain the undesirable glazed film which causes this instability. Hence, it will be seen that a friction element so affected cannot recover desired frictional stability through normal use of the friction element. This condition is commonly known in the art as "fade" and "recovery."

Furthermore, the heat decomposition of the bond is attended by a softening thereof and results in loss of volatile matter which causes the structure of the friction element to become impaired. When the structure is so impaired, it has been observed that there is an increase in friction and that the friction element wears away at a comparatively rapid rate, which obviously is undesirable inasmuch as it materially shortens the life of the element.

Moreover, when the glazed condition occurs, it is necessary to apply much greater braking forces than normally employed, and under such conditions, and with a softened bond, greater shearing forces are exerted within the structure of the element, likewise resulting in rapid wear.

Hence, it will be seen that it is important and desirable that the bonding agent employed in friction elements, and especially in heavy duty friction elements which are subjected to the severe service conditions and high temperatures referred to above, be able to withstand such severe usage and high temperatures without undergoing excessive heat decomposition of the bonds employed therein and resulting loss of stable friction characteristics under varying operating conditions.

Various attempts have heretofore been made to overcome the foregoing and other difficulties which have been experienced in the use of friction elements bonded with vulcanized natural hard rubber and among these has been its use with various substances, such, for example, as resins of the phenolic-aldehyde type, which are more heat-resistant than vulcanized natural hard rubber, and hence tend to protect the latter against the destructive effects of repeated high temperatures, but such efforts have not, insofar as we are aware, been entirely successful. Moreover, as will be pointed out hereafter, the problem here involved is not merely one of imparting heat-resistance to the bond but involves the employment of a bond which is not only heat-resistant but retains the friction characteristics of a friction element bonded thereby substantially stable even under severe usage at high temperatures.

Accordingly, an object of the present invention is to afford a new and improved friction element which is substantially free from the foregoing and other disadvantages and objectionable features which have been experienced heretofore in the severe usage of heavy duty friction elements bonded with resin-reenforced vulcanized natural hard rubber or with certain so-called synthetic rubbers hereinafter referred to.

Other and further objects of the present invention will be apparent from the following description and claims and from the accompanying drawings.

In the drawings,

Figs. 1 to 3, inclusive, are charts or graphs illustrating the characteristics of certain friction elements including selected friction elements embodying the present invention.

We have found that friction elements embodying as bonding agents certain resin-blended vulcanizable or so-called synthetic rubbers, which are hereinafter referred to, overcome or are substantially free from the foregoing and other difficulties and objectionable features which have been experienced heretofore in the use of friction elements employing resin-blended vulcanized natural hard rubber and other resin-blended vulcanizable synthetic rubbers as bonding agents, and exhibit desirable characteristics including friction stability.

More specifically, we have ascertained that friction elements embodying as bonding agents one or more resin-blended vulcanizable so-called synthetic rubbers of the butadiene-acrylonitrile copolymer type are resistant to heat depolymerization even at the high temperatures to which heavy duty friction elements are subjected in use upon automotive vehicle trucks, buses and the like, and that friction elements bonded with such materials do not, therefore, tend to form a relatively high percentage of benzol-extractable material upon being subjected to relatively high braking temperatures, and hence do not exhibit the consequent loss of friction stability, as do friction elements bonded with resin-blended vulcanized natural hard rubber or with certain other resin-blended synthetic rubbers hereinafter referred to, but retain substantially their original friction stability and other desirable characteristics.

Hence, it will be seen that the present invention is concerned with friction elements bonded with vulcanizable synthetic rubbers of the butadiene-acrylonitrile type, and which may be subjected to severe service conditions, rather than with friction elements bonded with other synthetic rubbers such as those of the chloroprene type, or with friction elements bonded with certain vulcanizable synthetic rubbers, such as those of the butadiene-styrene type, and which are not useful in the practice of the present invention.

It is also to be noted, in this connection, that at the high temperatures to which heavy duty type friction elements are subjected in use friction elements bonded with the chlorinated butadiene or chloroprene type of polymers such, for example, as "Neoprene G. N.," "Duprene," and the like, produce vapors of decomposition which are objectionable.

Moreover, in endeavoring to impart hardness to the chloroprene type of synthetic rubbers employed as bonding agents in friction elements it is necessary to load such bonding agents with excessive and undesirable amounts of fillers, and while such fillers impart a certain degree and character of hardness to such bonding agents and friction elements bonded therewith the resulting friction elements and the chloroprene type polymer bonding agents therein do not possess the desired hardness and other characteristics of friction elements bonded with the butadiene-acrylonitrile type of synthetic rubbers including high heat resistance under severe service conditions, friction stability, structural strength, and resistance to shearing and other forces applied during braking operations. Hence, for the foregoing and other reasons hereinafter referred to, such chlorinated polymers are not suitable for use in or as bonding agents in friction elements, in the practice of the present invention.

Included within the class of vulcanizable so-called synthetic rubbers which have been found to be particularly useful as bonding agents in friction elements in the practice of the present invention and which may be converted to a hard plastic material by indirect union through their double bonds, by means of a vulcanizing agent such, for example, as sulphur, is a group of synthetic rubbers of the butadiene-acrylonitrile copolymer type, and which are exemplified by the disclosure of Patent No. 1,973,000, granted September 11, 1934.

Other types of so-called synthetic rubbers are, of course, known, and among these are those of the butadiene-styrene copolymer type which are exemplified by the disclosure of Patent No. 1,938,731, granted December 12, 1933, and the now vulcanizable chloro-butadiene or chloroprene polymers, which have been referred to above, and which are known as "neoprene," "Duprene," and the like.

We have found that synthetic rubbers of the butadiene-styrene copolymer type, and those of the chloro-butadiene type, do not impart to friction elements the desirable characteristics, including the friction stability which is imparted thereto by synthetic rubbers of the butadiene-acrylonitrile copolymer type. The present invention is, therefore, primarily concerned with friction elements embodying in or as bonding agents therein vulcanizable so-called synthetic rubbers of the butadiene-acrylonitrile copolymer type, and to which specific reference will now be made.

The relationship of the monomer components and the general type of synthesis of the copolymer nuclei of the group of vulcanizable so-called synthetic rubbers which are referred to above and which we have found to be useful as bonding agents in friction elements, in the practice of the present invention, may be illustrated as follows (J. I. E. C., vol. 34, No. 2, pp. 243–251):

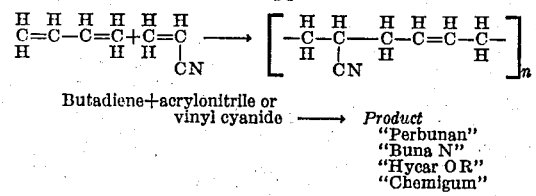

Butadiene+acrylonitrile or
vinyl cyanide ⟶ Product
"Perbunan"
"Buna N"
"Hycar OR"
"Chemigum"

It will be understood in connection with the general type of synthesis or polymerization illustrated above that certain of the ingredients, including the modifying agents, which are employed in the preparation of the particular synthetic butadiene-acrylonitrile copolymer known as "Hycar OR" and "Chemigum" are trade secrets, although both of these materials are regarded by persons skilled in the art as being copolymers of the butadiene-acrylonitrile type.

All four of the so-called synthetic rubbers referred to above, which are known to be useful in the practice of the present invention, are currently available upon the market in commercial quantities, under the trade names referred to.

It will be seen, therefore, from the foregoing description, and from the disclosures referred to therein, that the present invention is primarily concerned with friction elements having as a bonding agent therein one or more vulcanizable so-called synthetic rubbers of the character obtained by copolymerization (under conditions and in the presence of other materials, such, for example, as those which are disclosed in Patent No. 1,973,000) of a butadiene hydrocarbon of the type

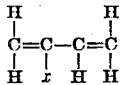

where $x$ represents either hydrogen or an alkyl group, and a compound (an acrylicnitrile) of the type

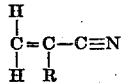

where R represents either hydrogen, as in acrylic acid nitrile, per se, or an alkyl group, as in methacrylic acid nitrile.

A suitable formula which may be followed in making friction elements for normal heavy duty service, in the practice of the present invention, is the following, in which all parts indicated are by weight:

Example No. 1

| | Parts by weight |
|---|---|
| Butadiene-acrylonitrile copolymer type synthetic rubber ("Perbunan," "Buna N," "Hycar Or," or "Chemigum" or a mixture of these) | 8.65 |
| Sulphur | 3.25 |
| Thermatomic carbon black | 4.0 |
| Rubber accelerator (benzothiazyl disulphide) | 0.25 |
| Zinc oxide | 2.0 |
| White lead | 10.0 |
| Asbestos | 24.0 |
| Barium sulphate | 7.5 |
| Phenol-formaldehyde resin | 9.5 |
| Graphite | 3.0 |
| Solvent (Nitromethane) | 9.0 |

A suitable formula which may be followed, in the practice of the present invention, in making friction elements which may be subjected to exceptionally severe heavy duty service, is the following, in which all parts indicated are by weight:

Example No. 2

| | Parts by weight |
|---|---|
| Butadiene-acrylonitrile copolymer type synthetic rubber ("Perbunan," "Buna N," "Hycar OR," or "Chemigum" or a mixture of these) | 3.0 |
| Sulphur | 0.6 |
| Rubber accelerator (benzothiazyl disulphide) | 0.03 |
| Zinc oxide | 0.5 |
| Thermatomic carbon black | 0.5 |
| Barytes | 11.0 |
| Phenol-formaldehyde resin | 12.0 |
| Asbestos | 40.0 |
| Powdered brass | 10.0 |

The compositions illustrated in the foregoing examples may be converted into heavy duty type friction elements by forming them into friction element shapes and then effecting the cure of the bond, as by the application of heat and pressure. Thus, for example, a temperature of from about 300° F. to about 325° F., and the application of a pressure of about two thousand pounds per square inch, for about four hours, are suitable for this purpose, it being understood that the preferred or optimum temperature, pressure and application time stated above may be varied somewhat depending in part upon the particular composition and the specific temperature, pressure and application time employed.

It will be noted that in the foregoing Examples Nos. 1 and 2 the sulphur and the initially unvulcanized copolymer are employed as components of the bond within a ratio of not substantially less than 20 parts of sulphur to 100 parts of the initially unvulcanized copolymer, by weight (Example No. 2), and that the initially unvulcanized copolymer and the resin are employed as components of the bond within a ratio of not substantially less than 1 part of the unvulcanized copolymer to 4 parts of the resin (Example No. 2) nor substantially more than one part of the unvulcanized copolymer to 1.09 parts of the resin, by weight (Example No. 1).

The graphs illustrated in the accompanying drawings show, among other things, the results of tests made upon, and comparative properties of, friction elements employing as a bonding agent therein vulcanized natural hard rubber (made from smoked sheet), or a blend of vulcanized natural hard rubber and reclaimed rubber, and friction elements employing the vulcanizable butadiene-acrylonitrile copolymer type so-called synthetic rubbers hereinbefore referred to, all of the above mentioned bonding agents having been blended with the same synthetic heat-resistant resin, and all of the specimens tested being the same in composition, both qualitatively and quantitatively, except for the nature of the resin-blended bonding agent employed, so that the graphs shown in the drawings illustrate comparative properties and characteristics imparted to the friction elements tested by the bonding agents employed therein.

In addition to illustrating the results of tests made upon friction elements employing the bonding agents referred to immediately above, certain of the accompanying graphs illustrate the results of tests made upon friction elements bonded with other types of resin-blended vulcanizable synthetic rubbers such as those of the butadiene-styrene copolymer type ("Buna S") which are not useful in the practice of the present invention, for reasons which will be pointed out hereinafter.

Thus, in all of the curves shown in the drawings the curves numbered 1 illustrate the results of tests made upon friction elements bonded with a mixture of resin-blended vulcanized natural hard rubber (made from smoked sheet), and reclaimed rubber; the curves numbered 2 illustrate the results of tests made upon friction elements bonded with resin-blended vulcanized natural hard rubber only (made from smoked sheet); the curves numbered 3 illustrate the results of tests made upon friction elements bonded with a resin-blended synthetic rubber of the butadiene-acrylonitrile copolymer type ("Hycar OR"); the curves numbered 4 illustrate the results of tests made upon friction elements bonded with another resin-blended synthetic rubber of the butadiene-acrylonitrile copolymer type ("Perbunan"); the curves numbered 5 illustrate the results of tests made upon friction elements bonded with a resin-blended synthetic rubber of the butadiene-styrene copolymer type ("Buna S"); the curves numbered 6 illustrate the results of tests made upon friction elements bonded with another resin-blended synthetic rubber of the butadiene-acrylonitrile copolymer type ("Buna NM"); and the curves numbered 7 illustrate the results of tests made upon friction elements bonded with a fourth resin-blended vulcanizable synthetic rubber of the butadiene-acrylonitrile copolymer type which is useful in the practice of the present invention, namely, "Chemigum."

Fig. 1 shows the results of tests made upon specimens of heavy duty type friction elements at a substantially constant temperature of 600° F. The abscissae in this figure represent the number of hours at which the specimens were maintained at a substantially constant temperature of 600° F., and the ordinates represent the percentages, by weight, of benzol-extractable material formed by heat depolymerization of the polymerized bonds employed in the specimens upon which these heat tests were made.

We have found, in this connection, that the percentage of benzol-extractable material in a friction element which has been subjected to use is indicative of the extent of heat deterioration of the bond therein.

From Fig. 1 it will be seen that the friction elements which were bonded with a blend of vulcanized natural hard rubber and reclaimed rubber (curve 1), the friction element bonded with resin-blended vulcanized natural hard rubber (smoked sheet) only (curve 2), and the friction element bonded with the resin-blended butadiene-styrene copolymer type of synthetic rubber-like material (curve 5), all exhibited decidedly greater heat depolymerization of the bond, as indicated by percentages of benzol-extractable material formed at the end of the first hour as well as throughout the entire remaining time during which the specimens were subjected to a substantially constant temperature of 600° F., than was exhibited by the specimens of heavy duty type friction elements which were bonded with the resin-blended butadiene-acrylonitrile copolymer type vulcanized synthetic rubber-like materials (curves 3, 4, 6 and 7) which are employed in the practice of the present invention.

Thus, the graphs illustrated in Fig. 1 show the much lower percentage of benzol-extractable material formed in heavy duty type friction elements bonded with the resin-blended butadiene-acrylonitrile copolymer type vulcanizable synthetic rubbers hereinbefore referred to as compared to heavy duty type friction elements bonded with resin-blended vulcanized natural hard rubber, or with a blend of vulcanized hard rubber and reclaimed rubber, or with a resin-blended vulcanized synthetic rubber of the butadiene-styrene copolymer type, wherefore friction elements bonded with the materials which have been found to be useful in the practice of the present invention have correspondingly better friction stability, greater resistance to softening, and greater resistance to shearing forces applied in braking operations and the like.

Fig. 2 shows the results of heat tests upon specimens of heavy duty type friction elements at progressively increasing temperatures of from 400° F. to 700° F., one hour at each temperature in the four temperature steps from 400° F. to 700° F., which are shown by the abscissae in Fig. 2.

The ordinates in Fig. 2 represent the percentage, by weight, of benzol-extractable material formed in the specimens which were tested during these heat tests and the percentage of benzol-soluble material extracted from the specimens shows the extent to which the organic bonds embodied in the specimens underwent heat depolymerization with consequent formation of benzol-soluble or benzol-extractable material and resulting loss of friction stability and softening of the friction elements and accompanying loss of resistance to breakdown under the shearing forces applied in braking operations, and other associated undesirable characteristics hereinbefore pointed out.

Fig. 2 shows that even at such relatively low temperatures as between 400 F. and 500° F., to which friction elements employed upon passenger cars and light trucks may be subjected, under severe service conditions, and to a greater extent at the higher temperatures shown in Fig. 2 and to which heavy duty type friction elements are subjected, especially under severe service conditions, the friction element which was bonded with a blend of vulcanized natural hard rubber and reclaimed rubber (curve 1), the friction element which was bonded with resin-blanded vulcanized natural hard rubber only (made from smoked sheet) (curve 2), and the friction element which was bonded with the resin-blended butadiene-styrene copolymer type of synthetic rubber (curve 5) all exhibited materially greater heat depolymerization, as measured by formation of benzol-extractable material, than was exhibited by the friction elements which were bonded with the resin-blended vulcanized butadiene-acrylonitrile copolymer type of rubbers (curves 3, 4, 6 and 7) which are employed as bonding agents in the practice of the present invention.

Fig. 2 thus clearly demonstrates the superiority of friction elements bonded with the vulcanizable butadiene-acrylonitrile copolymer type rubbers (curves 3, 4, 6 and 7), which are employed in the practice of the present invention, over friction elements bonded with either resin-blended vulcanized natural hard rubber alone (curve 2) or blended with reclaimed rubber (curve 1) as well as over friction elements bonded with vulcanized resin-blended synthetic rubber-like materials of the butadiene-styrene copolymer type (curve 5).

Fig. 3 shows the results of hardness tests made upon specimens of heavy duty type friction elements subjected to progressively increasing temperatures of from 400° F. to 700° F., the specimens having been kept for one hour at each temperature step from 400° F. to 700° F., as shown by the abscissae in Fig. 3.

The ordinates in Fig. 3 represent relative hardness, as measured upon an arbitrary scale of hardness and by known methods, the relative hardness of the specimens tested decreasing from an arbitrary zero at the top of the scale toward the bottom thereof.

From Fig. 3 it will be seen that the specimen of friction elements bonded with a blend of resin-blended vulcanized natural hard rubber and reclaimed rubber (curve 1), the specimen of friction element bonded with resin-blended vulcanized natural hard rubber only (curve 2), and the specimen of a friction element bonded with a resin-blended vulcanized butadiene-styrene copolymer type of synthetic rubber-like material (curve 5), all exhibited decidedly greater softness, particularly in the higher temperature range of from about 450° F. to 700° F., than was exhibited by the friction elements bonded with the resin-blended vulcanized butadiene-acrylonitrile copolymer type of so-called synthetic rubbers (curves 3, 4, 6 and 7), which are employed as bonding agents in friction elements in the practice of the present invention.

It will be seen, therefore, from the foregoing description, considered in conjunction with the accompanying drawings, that the present invention affords a new and improved friction element having desirable properties and characteristics, including greater friction stability, greater resistance to softening at high temperatures, greater resistance to the shearing and other forces applied during braking operations, and other related or associated desirable characteristics hereinbefore mentioned, as well as others inherent in the invention, and thus accomplishes its intended objects, including those hereinbefore specifically set forth, and others which are inherent in the practice of the present invention.

It will likewise be seen from the foregoing description, considered in conjunction with the accompanying drawings, that the present invention affords a new and improved friction element, and method of making the same, and which friction element is especially adapted for use where it is or may be subjected to severe service conditions.

While we have illustrated and described selected embodiments of our invention, and of the new friction element made in the practice thereof, it is to be understood that these are capable of variation and modification and we therefore do not wish to be limited to the precise details of the friction elements, compositions and method set forth but desire to avail ourselves of such changes and modifications as come within the purview of the following claims.

We claim:

1. A heavy duty friction element for use upon vehicular brakes comprised of a mass of friction material, inert filler, and a friction-modifying agent bonded with the heat reaction product of a mixture of an initially unvulcanized synthetic butadiene 1,3 acrylonitrile copolymer, sulphur, a vulcanization accelerator, and a heat-resistant phenolic-aldehyde resin, the sulphur and the synthetic butadiene 1, 3 acrylonitrile copolymer being employed as components of said bond within a ratio of not substantially less than twenty parts of sulphur to one hundred parts of the initially unvulcanized copolymer, by weight, and the initially unvulcanized copolymer and the resin being employed as components of said bond within a ratio of not substantially less than 1 part of the unvulcanized copolymer to 4 parts of the resin nor substantantially more than 1 part of the unvulcanized copolymer to 1.09 parts of the resin, by weight, said friction element being characterized by possessing a high degree of resistance to destructive distillation and to heat-depolymerization of the components of the bond at high temperatures during braking operations.

2. A heavy duty friction element for use upon vehicular brakes comprised of a mass of friction materials including asbestos, inert fillers, and a friction-modifying agent bonded with the heat reaction product of a mixture of an initially unvulcanized synthetic butadiene 1, 3 acrylonitrile copolymer, sulphur, a vulcanization accelerator, and a heat-resistant phenol-formaldehyde resin, the sulphur and the synthetic butadiene 1, 3 acrylonitrile copolymer being employed as components of said bond within a ratio of not substantially less than twenty parts of sulphur to one hundred parts of the initially unvulcanized copolymer, by weight, and the initially unvulcanized copolymer and the resin being employed as components of said bond within a ratio of not substantially less than 1 part of the unvulcanized copolymer to 4 parts of the resin nor substantially more than 1 part of the unvulcanized copolymer to 1.09 parts of the resin, by weight, said friction element being characterized by possessing a high degree of resistance to destructive distillation and to heat-depolymerization of the components of the bond at high temperatures during braking operations.

EMIL C. KELLER.
RAY E. SPOKES.